United States Patent
Sich et al.

(10) Patent No.: US 6,908,409 B2
(45) Date of Patent: Jun. 21, 2005

(54) STEPLESS FRICTION DRIVE

(75) Inventors: Bernard Sich, Friedrichshafen (DE); Axel Matheis, Sauldorf (DE)

(73) Assignee: ZF Friedrichshafen AG, Friedrichshafen (DE)

(*) Notice: Subject to any disclaimer, the term of this patent is extended or adjusted under 35 U.S.C. 154(b) by 204 days.

(21) Appl. No.: 10/332,356

(22) PCT Filed: Jul. 7, 2001

(86) PCT No.: PCT/EP01/07824

§ 371 (c)(1),
(2), (4) Date: Jan. 3, 2003

(87) PCT Pub. No.: WO02/06702

PCT Pub. Date: Jan. 24, 2002

(65) Prior Publication Data

US 2003/0158013 A1 Aug. 21, 2003

(30) Foreign Application Priority Data

Jul. 15, 2000 (DE) .......................... 100 34 454

(51) Int. Cl.⁷ .............................................. F16H 13/10
(52) U.S. Cl. ............................................ 476/45; 476/48
(58) Field of Search ............................... 476/40, 42, 43, 476/45, 48, 50

(56) References Cited

U.S. PATENT DOCUMENTS

| | | | |
|---|---|---|---|
| 4,281,559 A | 8/1981 | Sharpe | 74/200 |
| 5,395,292 A * | 3/1995 | Fellows et al. | 476/10 |
| 5,423,727 A | 6/1995 | Fellows | 476/40 |
| 5,564,993 A * | 10/1996 | Robinson | 476/10 |
| 5,820,512 A | 10/1998 | Nakano | 476/10 |
| 5,989,150 A | 11/1999 | Yamamoto | 476/8 |
| 6,155,953 A | 12/2000 | Oshidari | 476/10 |
| 6,402,657 B1 | 6/2002 | Sich | 476/42 |
| 2002/0187876 A1 * | 12/2002 | Imanishi | 476/8 |

FOREIGN PATENT DOCUMENTS

| | | | |
|---|---|---|---|
| DE | 27 36 553 | 2/1978 | F16H/15/40 |
| DE | 197 47 695 A1 | 5/1998 | F16H/15/38 |
| DE | 197 54 725 A1 | 6/1999 | F16H/15/38 |
| DE | 198 26 057 A1 | 12/1999 | F16H/15/38 |
| DE | 198 29 109 A1 | 1/2000 | F16H/15/38 |
| DE | 199 27 268 A1 | 1/2000 | F16H/15/38 |
| EP | 0 882 910 A2 | 12/1998 | F16H/15/38 |
| EP | 0 933 559 A2 | 8/1999 | F16H/15/38 |
| JP | 2000018355 | 1/2000 | F16H/15/38 |

* cited by examiner

Primary Examiner—David Fenstermacher
(74) Attorney, Agent, or Firm—Davis & Bujold, P.L.L.C.

(57) ABSTRACT

The invention relates to a stepless friction drive (1) in which friction wheels (2) are mounted. Said friction drive is provided with a system that allows a compensatory displacement of the corresponding friction wheel (2) when the input and output wheels are elastically deformed. Said system is mounted between the lower end of every support (1) and the hydraulic piston (6). The compensation system comprises an upper bearing shell (3), a lower bearing shell (5) and balls (4) that are maintained in a defined arrangement by means of a cage (9).

3 Claims, 4 Drawing Sheets

——— Unloaded variator
- - - - - - Unloaded variator with $F_A$

STEPLESS FRICTION DRIVE

FIELD OF THE INVENTION

The present invention concerns an infinitely variable friction wheel transmission.

BACKGROUND OF THE INVENTION

An infinitely variable friction wheel transmission of this type usually has input and output discs arranged coaxially on a common shaft, arranged together in pairs and whose inside surfaces are designed in a toroidal shape, with friction wheels arranged between the pairs of input and output discs. These friction wheels are in frictional contact with both the input discs and the output discs, and transfer the torque transmitted to them from the input disc to the output disc by virtue of friction-force contact, the rotation speed of the friction wheels being greater, the larger is the distance between their point of contact with the input disc and the rotation axis. In contrast, the rotation speed of the output discs is the higher, the closer the point of contact between the friction wheel and the output disc is to the rotation axis. Accordingly, by swivelling the friction wheels, the rotation speed of the output discs can be adjusted infinitely variably and as desired. For this purpose, the rotation axles of the friction wheels are, in each case, mounted on a support which can be controlled by means of a swivelling device.

An infinitely variable friction wheel transmission of the said type is described in DE A 197 54 725 by the present applicant. This transmission comprises an input shaft connected to a torque converter or a fluid-operated clutch of a vehicle engine, with two transmission units arranged coaxially with respect to the input shaft. The input discs and the output discs are mounted on a torque shaft which can move slightly in the axial direction relative to the input shaft. The two input discs are mounted on the torque shaft in rotationally fixed positions with respect to it, but are able to slide axially on it. A roller-shaped pressure device is mounted so that it can move axially on the input shaft but is rotationally fixed with respect to it, and this acts upon one of the input discs in the axial direction, pushing it towards the associated output disc. The upper ends of the supports carrying the friction wheels engage in two recesses in the housing and are fitted and able to rotate therein, wheel, brings it closer to one of the two discs, while if one of the discs is axially fixed, the control force can act upon the friction wheel.

Since the transmission ratio is adjusted by displacing the friction wheel tangentially with respect to the transmission axis in these infinitely variable friction wheel transmissions, swivelling forces from the drive input and output discs can act upon the friction wheel since they have to be pressed against the friction wheel to transfer the torque. In the known infinitely variable transmissions, the friction wheel in each transmission unit is arranged such that its swivel axis is positioned at the mid-point of the torus formed by the associated drive input and output discs. At the contact points of the friction wheel with the associated drive input and output disc, when the transmission ratio is adjusted so-termed normal forces are produced. To prevent the resultant torque imposed on the friction wheel from producing any undesired modification of the drive transmission ratio, it has already been proposed by the present applicant in DE A 198 26 057 that to control the transmission ratio, the difference between the normal forces acting on each wheel by virtue of the contact pressure forces exerted by the associated input disc and output disc should be compensated by producing a control force, such that with the friction wheel held axially, this control force, which leads to a tilting of the friction wheel, brings it closer to one of the two discs, while if one of the discs is axially fixed, the control force can act upon the friction wheel.

The purpose of the present invention is to reduce the structural complexity of an infinitely variable friction wheel transmission and, at the same time, avoid undesired transmission ratio deviations caused by elastic deformations, in particular of the input and output discs when they press against the friction wheel.

SUMMARY OF THE INVENTION

The invention stems from the recognition that due to the contact pressure of the input and output discs against the friction wheels with the friction force necessary to produce effective force transfer, elastic deformations can occur in the infinitely variable friction wheel transmission, these deformations affecting the input and output discs in particular. To ensure frictional contact and hence force transfer even when these components are elastically deformed, according to the invention, a compensation arrangement is provided which enables the friction wheel to undergo a corresponding compensatory movement. This compensation arrangement according to the invention, which is provided between the lower end of each support for the friction wheels and the hydraulic pistons for their vertical displacement, consists according to the invention of an upper bearing shell, a lower bearing shell, a cage, and balls inserted in the cage and between the two bearing shells in a predetermined arrangement. At the same time the compensation arrangement has a traction element passing through the middle thereof, which connects in an adjustable way the lower end of the support to the hydraulic piston. The tension force of the traction element can be adjusted by means of a tensioning device, in particular a tensioning screw.

The design of an infinitely variable friction wheel transmission according to the invention, which no longer entails mounting the friction wheels eccentrically in their supports, thus leads to a considerable reduction of the construction complexity and cost since not only the eccentrics, but also their bearings are omitted.

BRIEF DESCRIPTION OF THE DRAWINGS

The invention will now be described, by way of example, with reference to the accompanying drawings in which.

DETAILED DESCRIPTION OF THE INVENTION

Since infinitely variable friction wheel transmissions of this type are known to those familiar with the subject, in what follows only those components which are necessary for an understanding of the invention will be described in the description and illustrated in the attached drawings.

Figure 1:
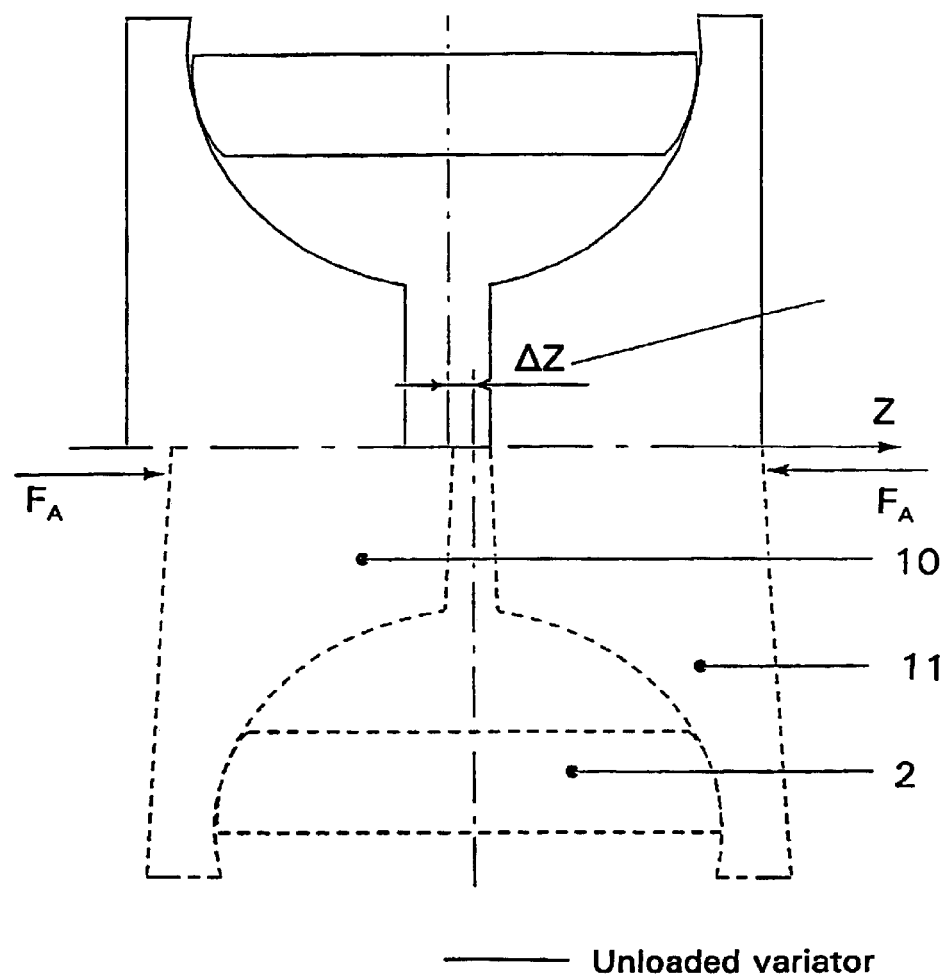
FIG. 1 is a schematic partial section through a transmission unit.

As can be seen in FIG. 1, in the upper half of which an input disc 10, an output disc 11 and a friction wheel 2 are shown in the unloaded condition and in the lower half the same components are represented by broken lines in the loaded condition, due to the contact pressure of the two discs 10, 11 against the friction wheel 2 with a force $F_A$, that is to say, the friction force necessary to produce the force transfer, the two discs 10, 11 are elastically deformed. To ensure frictional contact and hence force transfer, even when the discs 10, 11 are elastically deformed, the friction wheel 2 must undergo a corresponding compensation movement $\Delta Z$.

Figure 3:
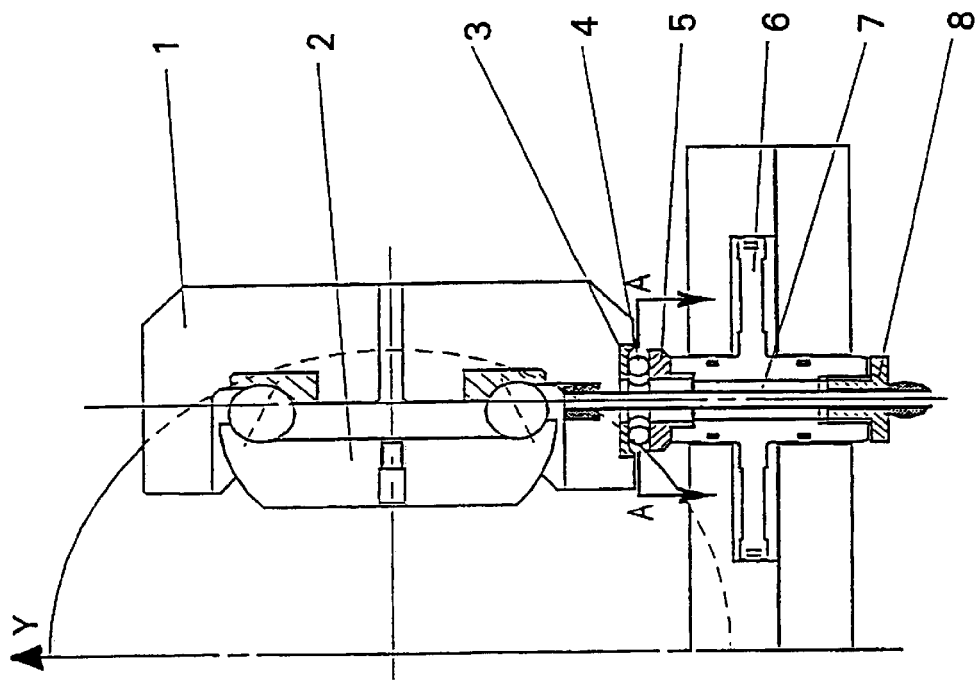
FIG. 3 is an axial section through the support arrangement.
Figure 2:
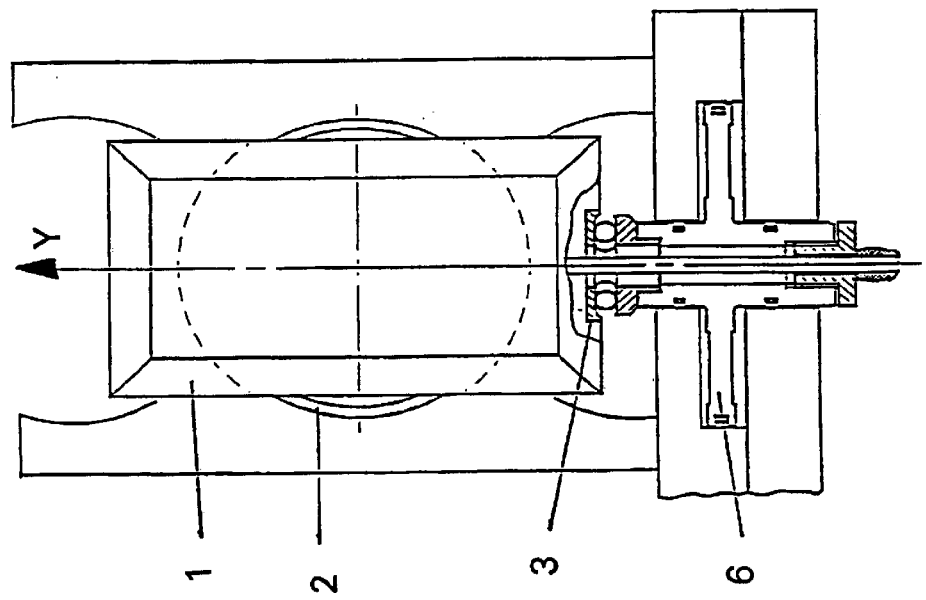
FIG. 2 is a partial radial section through the support arrangement.

FIGS. 2 and 3, of which FIG. 3 is a representation rotated by 90° relative to FIG. 2, show respectively a radial section and an axial section through a support for a friction wheel. The support is referenced as 1, the friction wheel 2, and the hydraulic piston connected to the support 1 is referenced as 6.

Figure 4:
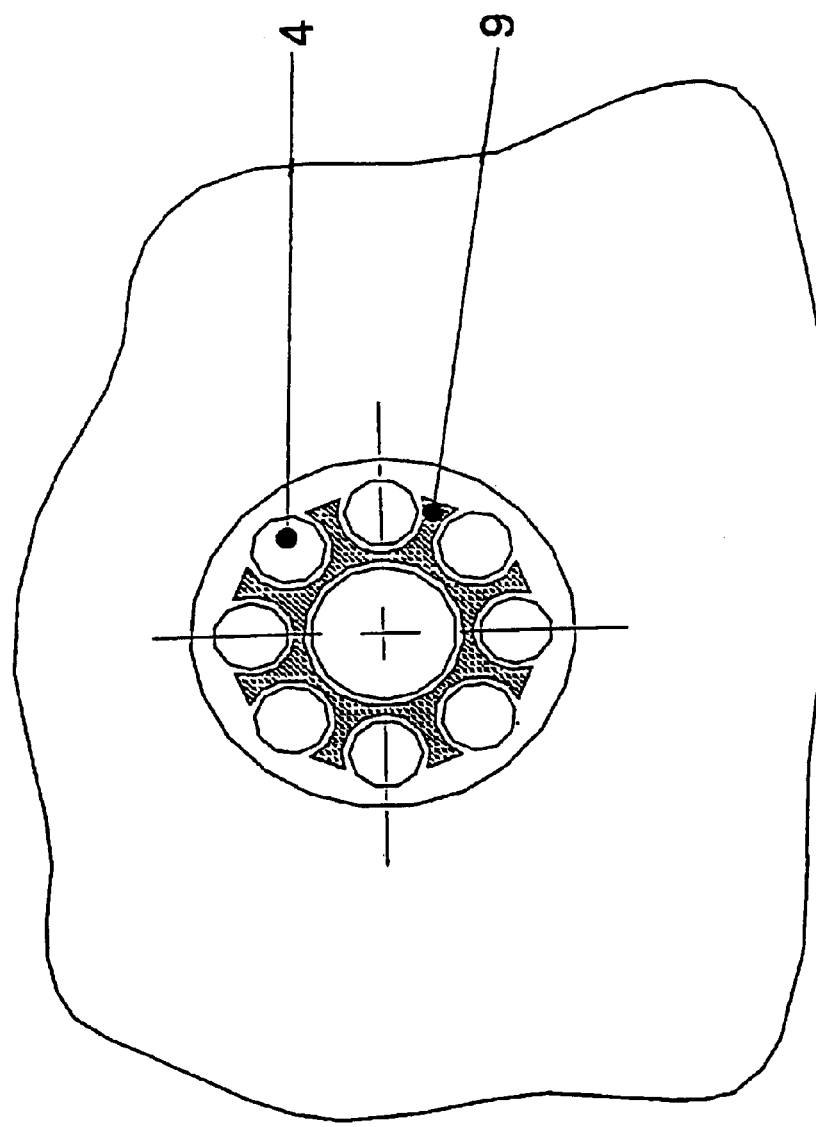
FIG. 4 is a plan view of the compensation arrangement.

According to the invention, a compensation arrangement is now provided at the lower end of the support 1 for the friction wheel 2 and above the hydraulic piston 6 which consists of an upper bearing shell 3, a lower bearing shell 5, and balls 4 arranged between them, these being held by a cage 9 in the specified arrangement (FIG. 4).

The compensation arrangement also has a traction element 7 passing through the middle, which is attached firmly to the support 1 at one end and adjustably connected to the hydraulic piston 6 at the other end via a tensioning device 8. The tension force of the traction element 7 can be adjusted by the tensioning device indicated, for example, as a tensioning screw.

The compensation arrangement allows differential movements between the hydraulic piston 6 and the support 1 in the X-Z plane but not in the Y direction. Under compression loading, force is transferred from the hydraulic piston 6 to the support 1 via the compensation arrangement. The tension forces are transferred by the traction element 7 connected to the hydraulic piston 6 which, at its other end, is connected firmly to the support 1.

The design of the support with the used compensation arrangement, according to the invention, reduces structural complexity compared with the conventional eccentric solution for mounting of the friction wheel 2 and, at the same time, prevents control deviations and hence undesired transmission ratio changes from taking place. Further, the hydraulic piston 6 is also largely uncoupled from the support 1 in the X-Z plane.

Figure 5:
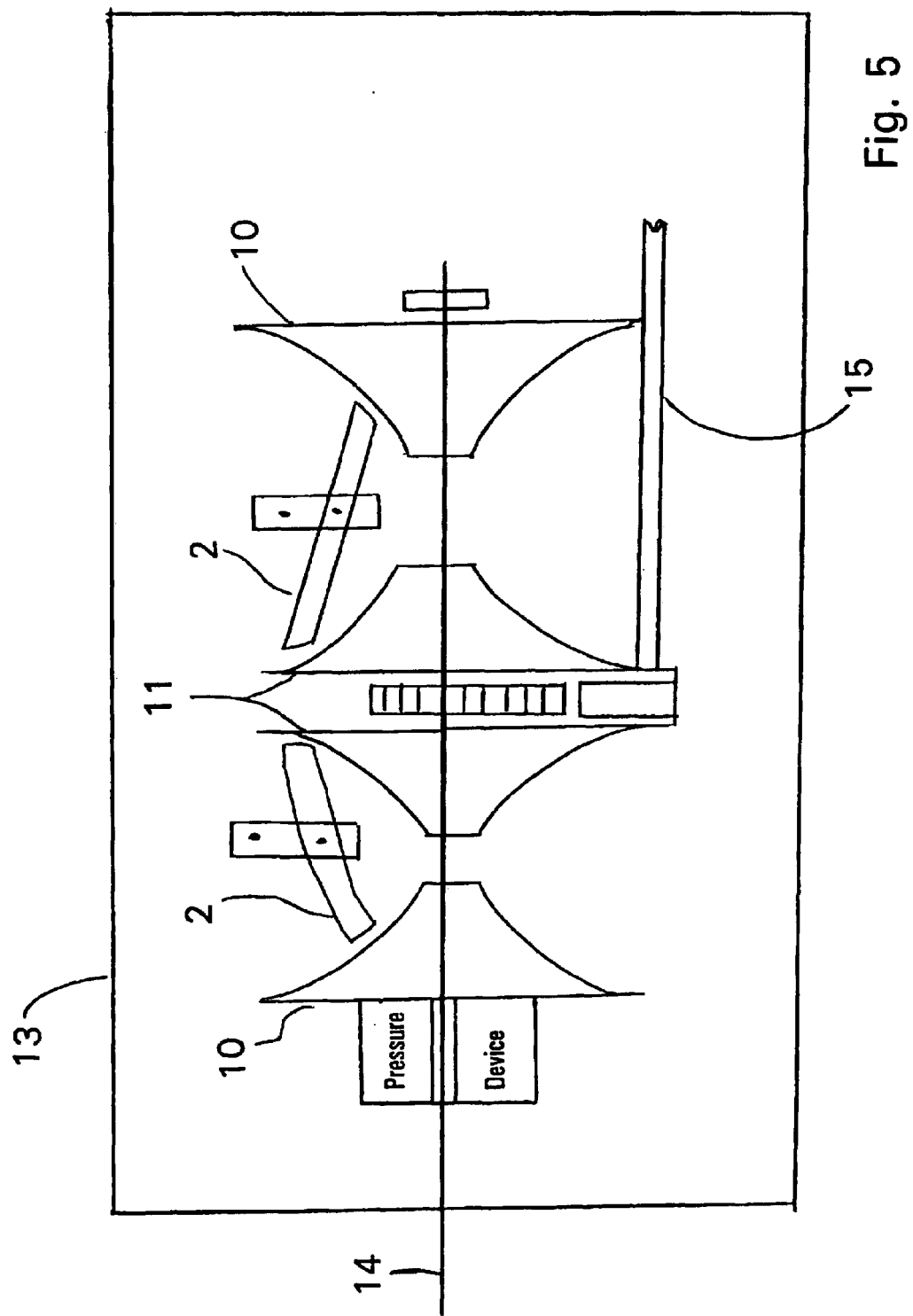
FIG. 5 is a diagrammatic view of the infinitely variable friction wheel transmission.

As can be seen in FIG. 5. an infinitely variable friction wheel transmission comprising: a housing 13, an input shaft 14, a torque shaft 15 arranged coaxially thereto, two input discs 10 with toroidally shaped inside surfaces, arranged coaxially with the input shaft 14. The two output discs 11 have toroidally shaped inside surfaces and are arranged coaxially with the input shaft 14 such that in each case one input disc 10 and one output disc 11 form a pair. The two output discs 11 are arranged in mirror symmetry and adjacent to one another. Several friction wheels 2 are arranged between the inside surfaces of the pairs of input and output discs 10, 11 and able to swivel in order to transfer torque from the input disc 10 to the associated output disc 11. A support for each friction wheel 2, a swivelling device for the supports of the friction wheels, a pressure device for one of the input discs 10, in order to push it in the direction of the output discs 11, an output shaft, and a gearwheel arrangement between the output discs 11 and the input shaft 14. Between a lower end of each support 1 for the friction wheels 2 and the hydraulic piston 6 a compensation arrangement is provided which consists of an upper bearing shell 3, a lower bearing shell 5, a cage 9 and balls 4 inserted in the cage 9 and between the two bearing shells 3, 5, and a traction element 7 adjustably connects the bottom end of the support 1 to the hydraulic piston 6 and passes through the middle of the compensation arrangement.

| Reference numbers | |
|---|---|
| 1 | Support |
| 2 | Friction wheel |
| 3 | Bearing shell |
| 4 | Ball |
| 5 | Bearing shell |
| 6 | Hydraulic piston |
| 7 | Traction element |
| 8 | Tensioning device |
| 9 | Cage |

What is claimed is:

1. An infinitely variable friction wheel transmission comprising:

a housing;

an input shaft;

a torque shaft arranged coaxially therewith;

two input discs with toroidally shaped inwardly facing surfaces arranged coaxially with the input shaft;

two output discs with toroidally shaped inwardly facing surfaces arranged coaxially with the input shaft;

the two output discs being arranged in mirror symmetry and adjacent to one another, and input discs sandwiching the two output discs therebetween such that each one of the input discs is associated with one of the output discs and forms a pair;

a plurality of friction wheels arranged between the inwardly facing surfaces of the pairs of input and output discs, and the plurality of friction wheels being swivelable in order to transfer torque from the input disc to the associated output disc forming the pair;

a support for supporting each one of the plurality of friction wheels;

a swivelling device for the supports for the plurality of friction wheels, a pressure device associated with one of the input discs for forcing the one input disc toward the other input disc;

an output shaft; and a gearwheel arrangement located between the output discs and the input shaft;

wherein a compensation arrangement is provided between a bottom end of each support (1) for the friction wheels (2) and a hydraulic piston (6), the compensation arrangement comprises an upper bearing shell (3), a lower bearing shell (5), a cage (9) and plurality of balls (4) accommodated by the cage (9), and a traction element (7) is provided between the two bearing shells (3, 5) which adjustably connects the bottom end of the support (1) with the hydraulic piston (6) and passes through a middle of the compensation arrangement.

2. The friction wheel transmission according to claim 1, wherein a tensioning device (8) is provided for adjusting the tension force of the traction element (7).

3. The friction wheel transmission according to claim 2, wherein the tensioning device (8) is a tensioning screw.

* * * * *